20

United States Patent Office 3,057,798
Patented Oct. 9, 1962

3,057,798
WELL TREATING FLUID
John A. Knox, Duncan, Okla., assignor to Halliburton Company, Duncan, Okla., a corporation of Delaware
No Drawing. Filed Sept. 12, 1960, Ser. No. 55,127
16 Claims. (Cl. 252—8.55)

This invention relates to a fluid composition useful in the treatment of oil and gas wells and more particularly it relates to an aqueous acid composition which is useful in increasing the production of such wells.

Various methods have heretofore been proposed for increasing the productivity of oil wells. One of the more common methods used for accomplishing this result is to inject an acid into the well bore and after the acid has dissolved the adjacent acid soluble earth or rock formation, the spent acid is withdrawn. While such a method has increased production, the results have not always been entirely satisfactory. This is true because even though many formations are very soluble in the acid (nearly 100%), there is a certain small insoluble portion that may cause serious trouble if adequate means are not taken to avoid such difficulties. These insoluble materials are present in the form of fine silt held in the calcareous binder of the formation.

Typical analyses of various formations penetrated by a well bore illustrating this as determined by X-ray analyses of core samples taken from the formations are as follows: A core sample taken from the 11,127–11,130 foot level of the North Russell Field, Devonian Formation, showed the solubility to be 94.6%, a trace of quartz, a major amount of dolomite, and no clay present. Another core sample obtained from the 10,426–10,427 foot level of the Pegasus Field, Pennsylvanian Formation, showed a solubility of almost 100%, a trace of quartz and salt, a major amount of calcite, and no clay present. A third core sample taken from the 9,100 foot level of the Wolf-camp Formation, Nolley Field indicated a solubility of 83.8%, a small amount of quartz, no clay, major amount of calcite and a trace amoun tof dolomite.

When a calcium or a magnesium-calcium carbonate portion of the formation is dissolved by the acid the fine insoluble silt particles therein are released and are free to move through the porous system. If the flow becomes low enough, these particles tend to settle out and subsequently clog the capillary pores or fine fractures of the formation.

This precipitation of these insoluble materials in the formation masks the further effectiveness of the acid treatment, interferes with the subsequent removal of the spent acid, and, of course, seriously retards the flow of oil from the well after treatment. Moreover, such treatments break up the suspension of mud normally present in an oil well, and the precipitated mud also tends to clog the pores in the formation.

In an attempt to overcome the foregoing difficulties, it has been proposed to use an acid solution to which is added a sequestering agent to suppress the calcium ions or otherwise "lock up" those ions plus a mud peptizing agent. U.S. Patent 2,128,161 fully discloses a well treating fluid of this type.

Even though the foregoing modifications of the acid treating process have tended to alleviate the objections, the results have not been entirely satisfactory. For example, it has generally been necessary to add more than one component to the acid solution and in many cases the presence of these additives has exerted a suppressing effect upon the solubility of the dolomite formation or the dissolving powers of the acid.

It is, therefore, a principal object of the present invention to provide a well treating fluid that obviates the disadvantages of the prior art fluid compositions.

It is another object of my invention to provide a fluid composition that will accelerate the dissolving power of the acid on slow acting dolomite.

It is yet another object of this invention to provide a fluid composition which avoids the clogging of the pores of the formation with precipitated mud, silt, or other undissolved materials during the treatment of the well by acting as a suspending agent for such insoluble materials.

Other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the foregoing objects and advantages are attained by employing a well treating fluid comprising an aqueous solution of a monobasic acid having incorporated therein the product formed by quaternizing a dialkyl amino alkyl methacrylate with a quaternizing agent.

Before proceeding with a specific example illustrating my invention, it may be well to indicate in general the nature of the materials required in the process.

METHACRYLATES

Suitable methacrylates include dialkyl amino alkyl methacrylates wherein the alkyl groups attached to the nitrogen (amino) atom contain from 1 to 18 carbon atoms. These alkyl groups may be the same, or they may be different. A preferred methacrylate is diethyl amino ethyl methacrylate.

QUATERNIZING AGENTS

Suitable quaternizing agents include alkyl halides wherein the carbon content of the alkyl radical varies from 1 to 3, aryl halides such as benzyl halide, benzal halide and benzo halide, and, of course, methyl sulfate. The chlorides are the preferred halides because they are available in larger quantities and at a more economical price than the other halides. Of all the quarternizing agents, methyl sulfate is preferred.

As to the amount of the quaternized methacrylate used in the fluid composition, that may vary from 0.1% to 5.0% by weight of the total composition. A preferred concentration both for economy and efficiency is 1%.

ACIDS

Suitable acids are monobasic acids including water soluble aliphatic acids, sulfamic acid and the inorganic acids nitric and hydrochloric. Of all the acids which may be used, hydrochloric is preferred. As to the concentration of the acid used, that may vary from 1 to 30%, preferably 10 to 20%, and even more preferably about 15%. Percentages are by weight.

When an acid solution such as the above is used in a well and which solution may come in contact with metal surfaces, it is advisable to add a corrosion inhibitor thereto. Suitable corrosion inhibitors are well known to those skilled in the art. Specific corrosion inhibitors which may be used are enumerated in U.S. Patent 1,877,504.

In order to disclose the nature of the present invention still more clearly, the following illustrative examples will be given. It is to be understood that the invention is not to be limited to the specific conditions or details set forth in these examples except insofar as such limitations are specified in the appended claims.

Example 1

In this example, two different aqueous acid solutions were prepared. Solution number 1 contained 15% hydrochloric acid and an iron corrosion inhibitor. Solution number 2 was identical to solution number 1 except 1% of the product formed by quaternizing diethyl amino ethyl methacrylate with methyl sulfate was added.

These acid solutions were then allowed to react upon dolomite cores that had been crushed and screened through a 3/8" screen and retained on a 1/4" screen. The reactions were conducted at 78° F., a pressure of 1,000 p.s.i.g. and for a reaction period of 30 minutes. At the end of this period, the amount of acid remaining in each solution was determined. The results are summarized in Table 1 below.

TABLE 1

| Solution: | HCl remaining percent |
|---|---|
| 1 | 2.6 |
| 2 | 2.0 |

It will be noted that solution No. 1 contained 30% more acid than did solution No. 2 at the end of the test period.

Example 2

In this example, the effectiveness of the methacrylate derivative as a suspending agent for bentonite was examined.

A stock solution was prepared consisting of ten grams of anhydrous calcium chloride dissolved in 100 ccs. of distilled water. Five grams of bentonite was added and then the mixture was agitated. The total volume of mixture was then made up to 200 ccs. by the addition of tap water.

The solution was divided into two parts of 100 ccs. each and one cc. of diethyl amino ethyl methacrylate quaternized with methyl sulfate was added to one part. Periodic observations of the solutions were made and are shown in Table 2.

As shown as the solids had stopped settling out, ten ccs. of diesel oil was added to each graduate and then agitated. Again periodic observations were made and the results of the comparison are also summarized in Table 2.

TABLE 2

| Time (Minutes) | Methacrylate Derivative [1] | Stock Solution [1] |
|---|---|---|
| 1 | 100 | 90. |
| 2 | 100 | 85. |
| 5 | 100 (6 ccs.) [2] | 45. |
| 10 | 100 (9 ccs.) [2] | 17. |
| 15 | 100 (9 ccs.) [2] | 14. |

AFTER ADDING 10CCS. DIESEL OIL

| | | |
|---|---|---|
| 3 | 100 (2 ccs.) [2] | 80 (5 ccs.) [2] |
| 5 | 100 (4 ccs.) [2] | 50 (6 ccs.) [2] |

[1] Top level of suspended solids in a graduate.
[2] The number in parentheses indicated a concentration of larger particles on the bottom of the graduate.

Example 3

In this example, the effectiveness of the methacrylate derivative as a suspending agent as compared to several other suspending agents used in acid solutions was determined.

These tests were conducted using the cores hereinbefore described and in accordance with the following procedure:

The core sample to be examined is ground and separated into two screen sizes. The major portion is made 4 to 20 mesh and the portion which goes through the 20 mesh screen is kept as the second screen size and may be particles as small as 325 mesh in the powder.

Calculations have shown that approximately 22 grams of 100% soluble calcium carbonate are required to completely neutralize 100 cc. of 15% HCl. Since this test was designed for cores which were not completely soluble as calcium carbonate and because an excess of ground core is desirable for both rapid and complete reaction, 22 grams of the 4–20 mesh core plus 8 grams of the through 20 mesh fines are added to the 100 cc. of 15% hydrochloric acid used in the tests. The 100 cc. portion of acid contains the additive which is to be tested for suspending properties.

The procedure for spending the acid consists of adding the 100 cc. of acid solution to a 1 liter Griffin beaker. A portion of the 4–20 limestone is added and the foaming action of the acid solution observed as carbon dioxide is released. If the foam is not excessive, then the rest of the 4–20 mesh limestone is added. After the acid is partially spent and the foaming action subsides, then 8 grams of "through 20 mesh" limestone is added and the acid is allowed to spend to a Congo red end point which is at a pH of about 4. This procedure is not particularly important in that any procedure of spending the acid can be used, but it is the one I follow to obtain a fast uniform test.

When the acid is spent, the contents of the beaker are mixed and the fluid portion decanted into a 100 cc. graduated cylinder. The larger chunks of rock will remain in the beaker but the fines will be transferred into the graduated cylinder.

Untreated acid will allow the fines to settle out to the bottom of the cylinder within a few minutes; however, better suspending agents will hold the silt in suspension for an extended period of time.

The solutions are allowed to stand in the graduated cylinder for three weeks. At the end of three weeks, the top 50 cc. of the solution is decanted and the rest of the solution stirred vigorously to re-suspend the fines. The solutions are allowed to stand for one week after concentrating and redispersing.

The fines are observed from time to time and their final state reported after seven days. If the major portion of the fine silt is still suspended, then the material can be considered for use. (There will probably be quite a bit of coarse silt in the bottom of the graduate.)

Materials which pass this test and keep the fines suspended for the fourth week after concentration and re-agitation are considered to have excellent suspending properties.

Many suspending agents were tested, including some which form gels. Table 3 is illustrative of the results of those tested, excluding any that formed gels.

TABLE 3

| Chemical | Concentration, percent by Weight | Acid Strength, percent | Appearance After 3 weeks | Appearance After 4 weeks [1] |
|---|---|---|---|---|
| Sodium Lignosulfonate | 1 | 15 | Clear | Clear. |
| Di-coco dimethyl Ammonium Chloride. | 1 | 15 | do | Do. |
| Sodium Salt of Condensed Aryl Sulfonic Acid. | 1 | 15 | do | Do. |
| Methacrylate Derivative | 1 | 15 | Turbid | Turbid. |

[1] Concentrated and agitated after three weeks as provided in the above described test procedure.

It should be noted that suspending agents may be considered satisfactory if they will retain the fines in suspension for only a few hours. With this in mind, the excellent suspending qualities of the methacrylate derivative can be appreciated since the fines were suspended for three weeks without agitation and then held in suspension for another week after being concentrated and re-agitated.

Similar results were obtained when the other methacrylate derivatives listed above as being suitable were substituted for the methacrylate derivative used in the foregoing examples. This also includes those derivatives quaternized with the other quaternizing agents listed above in addition to methyl sulfate.

It should be particularly pointed out that while the quaternized methacrylate derivatives enhance the suspending characteristics of the solutions and accelerate the speed of reaction with dolomite, there is no increase in the viscosity of the fluid. This, of course, permits a much easier and more efficient placement of the solution in the zone of the well to be treated.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A well treating fluid composition comprising an aqueous solution containing from about 1 to about 30 percent by weight of a well treating acid for dissolving earth formations and increasing the productivity of wells having incorporated therein from about 0.1 to about 5.0 percent by weight of the product formed by quaternizing a dialkyl amino alkyl methacrylate with a quaternizing agent wherein the alkyl groups of said methacrylate contain from 1 to 18 carbon atoms.

2. The well treating fluid composition of claim 1 wherein the alkyl groups of the methacrylate are ethyl groups.

3. The well treating fluid composition of claim 1 wherein the quaternizing agent is an alkyl halide, the alkyl group containing from 1 to 3 carbon atoms.

4. The well treating fluid composition of claim 1 wherein the quaternizing agent is an aryl halide.

5. The well treating fluid composition of claim 1 wherein the quaternizing agent is methyl sulfate.

6. The well treating fluid composition of claim 1 wherein the well treating acid is a water soluble aliphatic acid.

7. The well treating fluid composition of claim 1 wherein the well treating acid is an inorganic acid.

8. A well treating fluid for acidizing calcareous and dolomite formations comprising, an aqueous solution of a well treating acid for dissolving earth formations and increasing the productivity of wells and a product formed by quaternizing diethyl amino ethyl methacrylate with methyl sulfate, said product being present in an amount of about 0.1 to about 5.0 percent by weight of the total fluid.

9. A well treating fluid for acidizing calcareous and dolomite formations comprising, an aqueous solution of a well treating acid for dissolving earth formations and increasing the productivity of wells and a product formed by quaternizing diethyl amino ethyl methacrylate with a quaternizing agent selected from the group consisting of an alkyl halide and an aryl halide, the alkyl group containing from 1 to 3 carbon atoms, and said product being present in an amount of about 0.1 to about 5.0 percent by weight of the total fluid.

10. A well treating fluid for acidizing calcareous and dolomite formations comprising, an aqueous solution of hydrochloric acid in an amount of about 1 to about 30 percent by weight and a product formed by quaternizing diethyl amino ethyl methacrylate with methyl sulfate, said product being present in an amount of about 0.1 to about 5.0 percent by weight of the total fluid.

11. A well treating fluid for acidizing calcareous and dolomite formations comprising, an aqueous solution of hydrochloric acid in an amount of about 1 to about 30 percent by weight and a product formed by quaternizing diethyl amino ethyl methacrylate with a quaternizing agent selected from the group consisting of an alkyl halide and an aryl halide, the alkyl group containing from 1 to 3 carbon atoms, and said product being present in an amount of about 0.1 to about 5.0 percent by weight of the total fluid.

12. A well treating fluid composition comprising an aqueous solution containing from about 1 to about 30 percent by weight of hydrochloric acid having incorporated therein from about 0.1 to about 5.0 percent by weight of the product formed by quaternizing a dialkyl amino alkyl methacrylate with a quaternizing agent wherein the alkyl groups of said methacrylate contain from 1 to 18 carbon atoms.

13. A well treating fluid composition comprising an aqueous solution containing from about 1 to about 30 percent by weight of nitric acid having incorporated therein from about 0.1 to about 5.0 percent by weight of the product formed by quaternizing a dialkyl amino alkyl methacrylate with a quaternizing agent wherein the alkyl groups of said methacrylate contain from 1 to 18 carbon atoms.

14. A well treating fluid composition comprising an aqueous solution containing from about 1 to about 30 percent by weight of sulfamic acid having incorporated therein from about 0.1 to about 5.0 percent by weight of the product formed by quaternizing a dialkyl amino alkyl methacrylate with a quaternizing agent wherein the alkyl groups of said methacrylate contain from 1 to 18 carbon atoms.

15. A method of acidizing calcareous and dolomite formations, comprising the step of: injecting into said formations an aqueous acid solution, said solution containing from about 1 to about 30 percent by weight of a well treating acid capable of dissolving said formations, having incorporated therein from about 0.1 to about 5.0 percent by weight of the product formed by quaternizing a dialkyl amino alkyl methacrylate with a quaternizing agent wherein the alkyl groups of said methacrylate contain from 1 to 18 carbon atoms.

16. A method of acidizing calcareous and dolomite formations, comprising the step of: injecting into said formations an aqueous solution containing from about 1 to about 30 percent by weight of hydrochloric acid having incorporated therein from about 0.1 to about 5.0 percent by weight of the product formed by quaternizing a dialkyl amino alkyl methacrylate with a quaternizing agent wherein the alkyl groups of said methacrylate contain from 1 to 18 carbon atoms.

References Cited in the file of this patent

UNITED STATES PATENTS

| | | |
|---|---|---|
| 2,138,763 | Graves | Nov. 29, 1938 |
| 2,265,759 | Lawton et al. | Dec. 9, 1941 |
| 2,663,689 | Kingston et al. | Dec. 22, 1953 |
| 2,717,876 | Menaul | Sept. 13, 1955 |

UNITED STATES PATENT OFFICE
CERTIFICATE OF CORRECTION

Patent No. 3,057,798

October 9, 1962

John A. Knox

It is hereby certified that error appears in the above numbered patent requiring correction and that the said Letters Patent should read as corrected below.

Column 1, line 40, for "amoun tof" read -- amount of --; column 3, line 40, for "shown" read -- soon --; line 74, for "be" read -- have --.

Signed and sealed this 26th day of February 1963.

(SEAL)
Attest:

ESTON G. JOHNSON
Attesting Officer

DAVID L. LADD
Commissioner of Patents